A. STAUFFER.
SPIRIT LEVEL FOR MEASURING ANGLES AND INCLINATIONS.
APPLICATION FILED JULY 17, 1908.
946,472. Patented Jan. 11, 1910.
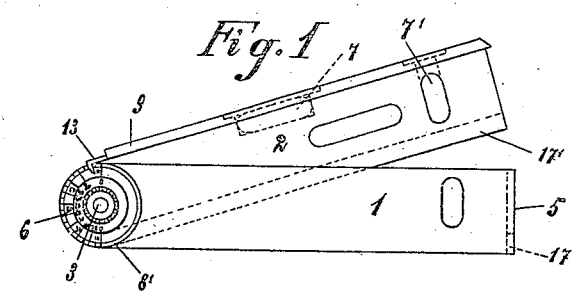
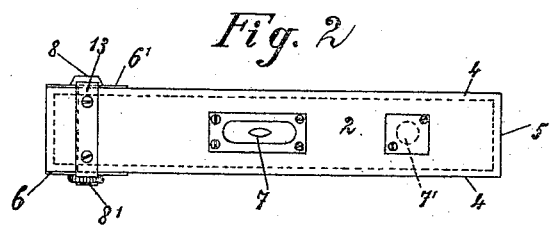
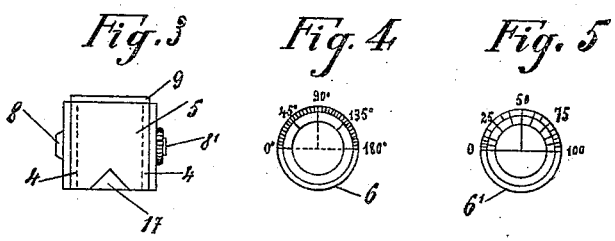
Witnesses:
Inventor:
Adolf Stauffer

UNITED STATES PATENT OFFICE.

ADOLF STAUFFER, OF ZURICH, SWITZERLAND.

SPIRIT-LEVEL FOR MEASURING ANGLES AND INCLINATIONS.

946,472.  Specification of Letters Patent.  Patented Jan. 11, 1910.

Application filed July 17, 1908. Serial No. 443,966.

*To all whom it may concern:*

Be it known that I, ADOLF STAUFFER, a citizen of Switzerland, and resident of Zurich, Switzerland, have invented an Improved Spirit-Level for Measuring Angles and Inclinations, of which the following is a specification.

The subject of this invention is a spirit level for measuring angles and inclinations. In the accompanying drawing, an example of the construction of the invention is shown, wherein:—

Figure 1 shows an elevation. Fig. 2 shows a plan. Fig. 3 shows an end view, and Fig. 4 and Fig. 5 show details.

The apparatus consists of two parts 1 and 2, hinged together by a bolt 3.

The part 1 consists of two parallel arms 4, connected by a cross bar 5. On the outer faces of these two arms, between them and the head 8, and nut $8^1$ respectively, of the bolt 3, two scales 6 and $6^1$ respectively, are attached, half of one of which is divided into 180 degrees, while half of the other is divided into 100 equal parts. Two tubes 7 and $7^1$ are fixed in recesses in the part 2 and filled with ether so as to leave an air bubble in each. The longitudinal axes of these tubes are set at right angles to one another. A strip of metal 13 is screwed onto the part 2, behind the stop piece 9, and has its ends bent down at right angles to the body of the strip so as to serve as pointers on the two scales 6 and $6^1$. When the two parts 1 and 2 are closed, both pointers indicate zero, when opened out at right angles to each other, one scale shows 180° and the other scale shows 100%.

The bottom sides of parts 1 and 2 are provided, one with a tongue piece 17, and the other with a groove $17^1$, which engage when the level is closed, and are of service in insuring the steadiness of the level on curved surfaces, such as shafts and the like.

When it is required to test inclinations or angles, the instrument is laid on one surface, then the arm 2 is raised till it lies along the other surface, the pointers 13 then indicate the inclination in degrees on one disk and in per cent. on the other disk. It can also be used as a spirit level in the ordinary way for testing objects with regard to their horizontal or vertical positions by the bulbs 7 and $7^1$. The level can also be used for measuring angles.

Having fully described my invention, what I claim and desire to secure by Letters Patent is:—

1. A spirit level, comprising in combination, a part 1, said part consisting of two arms 4, connected by a cross piece 5, a part 2, provided with recesses, two tubes 7 and $7^1$, arranged in these recesses with their longitudinal axes at right angles to each other, said tubes being filled with ether so as to leave an air bubble, a bolt 3, hinging said parts 1 and 2, together, said bolt having a head 8, and a nut $8^1$, two scales 6 and $6^1$, fastened between said side arms 4, and the head and nut respectively of said bolt 3, said scales being divided, one into degrees, the other into percentages of a right angle, a stop piece 9, fixed to said part 2, a metal strip 13, fixed to said part 2, having its ends bent down at right angles to the body of the said strip to form pointers traveling over the scales 6 and $6^1$, substantially as described and shown.

2. A spirit level, comprising in combination, a part 1, said part consisting of two arms 4, connected by a cross piece 5, a part 2, provided with recesses, two tubes 7 and $7^1$, arranged in these recesses with their longitudinal axes at right angles to each other, said tubes being filled with ether so as to leave an air bubble, a bolt 3, hinging said parts 1 and 2, together, said bolt having a head 8, and a nut $8^1$, two scales 6 and $6^1$, fastened between said side arms 4, and the head and nut respectively, of said bolt 3, said scales being divided, one into degrees, the other into percentages of a right angle, a stop piece 9, fixed to said part 2, a metal strip 13, fixed to said part 2, having its end bent down at right angles to the body of the said strip to form pointers traveling over the scales 6 and $6^1$, a tongue piece $17^1$, being provided on one of said parts 1 and 2, a groove 17, provided on the other of said parts 1 and 2, said groove and tongue piece being so arranged that when the instrument is closed, the groove and tongue piece engage with one another, substantially as described and shown.

In testimony whereof I have hereunto set my hand in the presence of two subscribing witnesses.

ADOLF STAUFFER.

Witnesses:
 A. LIEBERKNECHT,
 JOSEPH SIMON.